Patented July 3, 1945

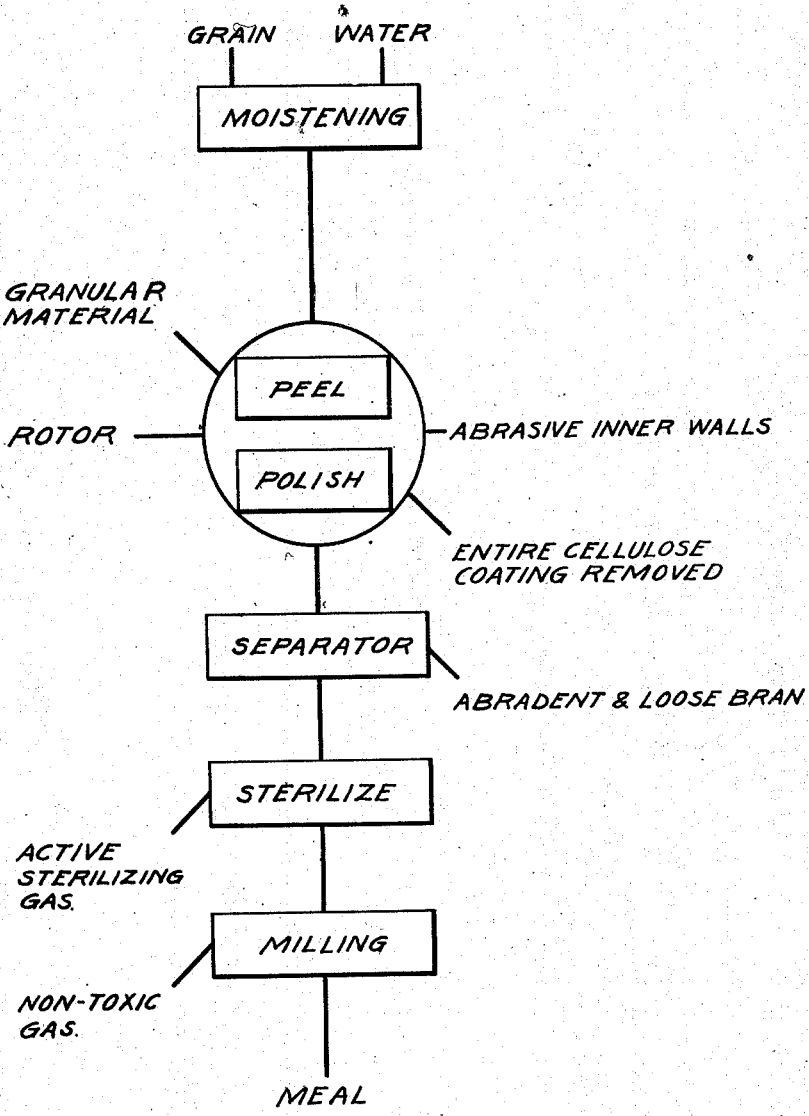

2,379,677

UNITED STATES PATENT OFFICE 2,379,677

METHOD OF MILLING GRAIN

Voldemar Borsakovsky, Saint-Julien par Sennecey le Grand (Saone-et-Loire), France; vested in the Alien Property Custodian Application July 15, 1942, Serial No. 451,014
In France April 30, 1941

2 Claims. (Cl. 99—153)

This invention relates to a new or improved method of processing cereal grains with a view to obtaining therefrom integral meal or flour capable of being perfectly conserved or kept without losing its properties.

For a proper understanding of the invention, it will be stated that an integral meal is one derived from the whole of the nutritive and non-replaceable elements to be found in cereal grains and particularly wheat grains in a state of intactness and accessibility to digesting juices as secreted by the human body.

It occurs that wheat grains naturally possess a remarkable constitution to the extent that when of good quality their composition approximates that connoting the average human food ration, as reckoned in carbohydrates and albumins, which is the most properly balanced and most favorable one to human nourishment.

Moreover the biochemical science of cereal grains and the studies conducted to ascertain the relative importance of their several constituents have disclosed that the entire berries of wheat grains contain useful substances either of a mineral or of an organic nature which foster life while their lack is a cause of human decay. Such useful substances are generally present in the germ or embryo and protein layer, the latter forming a portion of the inner layers of the grain berry.

It follows from the foregoing that should bread be baked from integral meal, it could almost by itself sufficiently nourish the body to maintain life in the human diet.

However, the preparation of integral meal, as above defined, affords great difficulties so far as the milling operations and the biological peculiarities of certain parts of the grain berries, namely, the germ or embryo and the protein under-covering are concerned. Such parts contain fatty and mineral substances and a number of diastases and vitamins that is to say substances which are highly sensitive to contamination by dirt and microbe impurities, also to the heat which is evolved during the process of milling.

As the present milling methods cannot overcome the aforesaid difficulties, the germ and protein underlayer of cereal grains have to be discarded and meal has to be produced almost exclusively from their central starchy portion which is deprived of those essential elements which in the process of nourishment are necessary to the maintenance of life. Consequently bread made from common meal or flour cannot fulfil a complete nourishing function for lack of essential feeding elements.

The impossibility of obtaining a so-called integral meal capable of being properly conserved for a long time by the present milling technique is mainly due to the two following reasons: Firstly, the impossibility of removing prior to the milling operations those dirts and microbe impurities which adhere to the grain berries, namely, to their outer surface and between the three cellulose coatings of the husk forming what is colloquially called the bran. Secondly, the impossibility of conducting the milling operations under perfectly sanitary or thoroughly clean conditions.

The reason for this is that prior to being subjected to the action of milling appliances, cereal grains are in those processes as used heretofore cleaned externally only. Therefore while they are being milled, they still contain microbe sources intermediate their cellulose layers or coating (bran) and particularly in the nick or furrow of the grain berries since this hollow is fully inaccessible to cleaning means in all existing plants. As a result of this, there is inevitably caused during the first operative phases of the present disintegrating processes a microbe-containing dust which intermingles itself with the products of the milling operations. Besides, even meal as at present obtained only from the starchy portion of cereal grains does not lend itself to a prolonged conservation. Moreover should those portions of cereal grains that contain fatty substances and certain diastases, as is the case with the germ and protein underlying coating, be added to such a meal as produced heretofore, the meal even thus enriched would soon deteriorate and proper conservation of stocks thereof would prove impossible.

It follows from the foregoing considerations that milling operations as commonly performed at the present time are conducted in a non-sanitary ambiance which cannot ensure the removal of dirts and microbe impurities which are the sole causes of the deterioration or contamination of meal, particularly so-called integral meal, as was shown and demonstrated by scientific studies and experiments. The latter also revealed that integral meal as produced under optimum sanitary conditions can be kept as well and as long as starchy meal.

Furthermore, when endeavoring to produce integral meal by the present milling methods, the following difficulties are encountered, namely:

(a) Integral meal gives rise to bread having a substantially darker color due to the presence of the seminal tegument layer containing a brown pigment and also to the presence of all kinds of microbe impurities which facilitate the development of noxious diastases during the fermentation of bread.

(b) Integral meal contains a larger percentage of coarsely milled cellulose, which curtails the development of bread.

The reasons for the set backs undergone in present milling methods when endeavoring to produce integral meal will now be better understood from the aforesaid explanations.

An object of the invention is to provide, as a new inventive process, an improved method each step of which is intended on the one hand to bring cereal grains to a proper state of cleanliness and, on the other hand, to keep them in said clean state throughout the whole set of preparatory and milling operations. Under the words "clean" and "cleanliness" should be understood not merely an absence of dirts, stains and microorganic impurities but also, in a more general sense, the absence of any outer contaminating influence such as atmospheric moisture and such introductions of microbes as might spoil or deteriorate the cereal grains by depriving them of the required purity and might cause noxious reactions such as those which lead to rancidity, fermentation and like phenomena.

Another object of the invention is to provide a method of processing cereal grains whereby an integral meal or flour can be obtained which contains all nutritive and non-replaceable elements of wheat grains in a state of intactness and proper accessibility to the digestive juices secreted in the human body, said meal lending itself to a perfect and prolonged conservation and giving to bread baked therefrom good palatable qualities and a color and a development substantially analogous to those of bread made from common starchy meal.

With these and such other objects in view as will incidentally appear hereafter, the invention consists in the character, sequence and combination of specific steps constituting the improved method as set forth and pointed out in the appended claims.

The drawing filed herewith illustrates diagrammatically the steps constituting the improved method.

In a suitable embodiment of the invention, the practical realization of the method may be as follows:

(A) Simultaneously with the customary step of removing or peeling off the bran layer from the previously moistened cereal grain so as to eliminate the pericarp, there is incorporated with the mass of grains which are being subjected to the treatment according to the invention a predetermined quantity of a granular material having abrading or attrition properties and a grain size definitely smaller than that of said cereal grains and possessing by itself a certain amount of roughness (advantageously and by way of example saw dust or an equivalent material) the purpose of which is, while penetrating into the nick or furrow of each grain berry, to detach therefrom whatever cellulose may have been left therein during said peeling step. This operation completes the cleaning of the grains while at the same time reducing the total quantity of cellulose which remains incorporated with the integral meal being produced.

(B) It should be borne in mind that the seminal tegument is made up of two layers or coatings of cells containing a brown pigment which, together with the hyaline band or strip, possess no nutritive value whatsoever. These two layers are inseparably connected with the protein layer and the three layers are known as the "welded and impervious layers." The removal of the seminal tegument and the hyaline band or the seminal tegument exclusively has so far never been carried out successfully. Now the brown pigment gives a peculiar color to the bread and, besides, the cellulose included in said two layers does not promote its development.

The removal of the layer of seminal tegument and of the hyaline band or only the seminal tegument is performed by an additional operation which comprises the step of imparting rotation to the mass of grains contained in a suitably shaped vessel. This follows the thorough cleansing operation carried out as set forth under A by means of a suitable quantity of a granular material having abrading or attrition properties and a grain size fairly smaller than that of the wheat grains, the inner wall of said vessel being also coated or otherwise provided with a lining of abrasive material.

This operation causes a very fine and regular polishing of the grain surface and consequently gives rise to a meal constituted by the seminal tegument and the hyaline band or the seminal tegument alone. By then subjecting the mixture of grains and granular abrasive material to the action of a separating or sifting device, segregation of both constituents may be obtained while a brushing action subsequent to the sifting removes the last traces of this meal.

(C) After having undergone the operation described under A and B, the wheat grains then freed of the whole of the outer cellulose are thus in a state of perfect cleanliness.

However, there remains the liability that during the aforesaid treatments and the transfer of the grains from one device to another one, such grains may face microbe impurities. In order to obviate such a risk and to subject to the milling operations perfectly that is to say aseptically clean grains, these are transferred to the mill through a sterilizer such for example as an ozonizer.

(D) Following this treatment, the grains may be considered as being perfectly clean and aseptized and ready to be subjected to the milling operations. Such a state of cleanliness must now be preserved and said operations should also take place under perfectly clean conditions.

In order to fulfil this requirement, it is essential that the worker should neither manipulate nor handle the wheat grains proper, nor the meal ground therefrom since it must remain perfectly clean for the aforesaid reasons. Consequently the milling operations must be entirely automatic without requiring either manual adjustment or supervision, nor the intervention of labor.

The grains brought to the mill include all the initial grains freed from the three layers or coatings of outer cellulose, seminal tegument and hyaline band or strip or else seminal tegument only. It will be seen therefore that the grains include substantially the whole of the nutritive and non-replaceable components that are naturally incorporated with the wheat.

As above stated, a number of non-replaceable substances are to be found in the cells of the protein underlayer. These are not attackable by the digesting juices. It is accordingly necessary to mechanically open them up. However, the apparatus as used in present milling plants cannot achieve this result without damaging the cereal grains. Such substances must be therefore ground by other means which particularly involve abrading processes.

It is a well known fact that the contents of the protein underlayer include fatty substances and a range of diastases (for example tyrosine) which are highly sensitive to moistness and above all to microbe influences. Under certain conditions, such substances become oxidized and impart to the meal and particularly to the bread made from it a dark color while being liable to produce noxious fermentations.

In order to remedy these disadvantages, the milling operation which involves an abrading process as well as the transfer and evacuation of the resultant meal should be carried out in an atmosphere formed of an inert and non-toxious gas such for example as carbon dioxide.

This result which is totally unattainable under present milling conditions cannot be obtained except if the milling operations are absolutely automatic and require neither the intervention of labor, nor any supervision involving manual handling by the operator and also if the milling plant proper is completely separate from the other appliances comprised in the mill.

What is claimed is:

1. A method of producing an aseptically clean integral meal from cereal grains comprising moistening a mass of grains; removing the pericarp from each grain; simultaneously incorporating with said mass a predetermined quantity of granular material having abrading properties and a grain size definitely smaller than the treated grains; removing from each treated grain its entire cellulose coating, thereby exposing its protein underlayer, by polishing each grain by imparting rotation to the said mass and the incorporated material causing particles of said granular material to penetrate the nicks and furrows of the treated grains and detach therefrom whatever cellulose may remain after the removal of the pericarp; separating the mass of removed cellulose coating and the granular material from the mass of treated grains; subjecting the treated grains to an atmosphere of an active sterilizing gas to sterilize the grains to prevent noxious fermentation; confining the treated grains in an atmosphere of an inert, non-toxic gas to protect the protein underlayer of each treated grain against oxidization, microbe contamination and noxious fermentation; and milling the treated grains, while so confined, to convert them into meal.

2. A method of producing an aseptically clean integral meal from cereal grains comprising moistening a mass of grains; incorporating with said mass a predetermined quantity of granular material having abrading properties and a grain size definitely smaller than the treated grains; rotating the said mass of grains and the said granular material thereby removing the pericarp from each grain and then causing particles of said granular material to penetrate the nicks or furrows of the treated grains and detach therefrom whatever cellulose may remain after the removal of the pericarp; removing from each grain its seminal tegument, thereby exposing its protein underlayer, by polishing each grain with said granular material; separating the granular material and the mass removed from the treated grains, from the mass of treated grains; subjecting the treated grains to an atmosphere of an active sterilizing gas to sterilize the grains to prevent noxious fermentation; protecting the protein underlayer of each treated grain by confining the treated grains in an atmosphere of an inert, non-toxic gas; and milling the treated grains, while so confined, to convert them into meal.

VOLDEMAR BORSAKOVSKY.